United States Patent Office 3,294,436
Patented Dec. 27, 1966

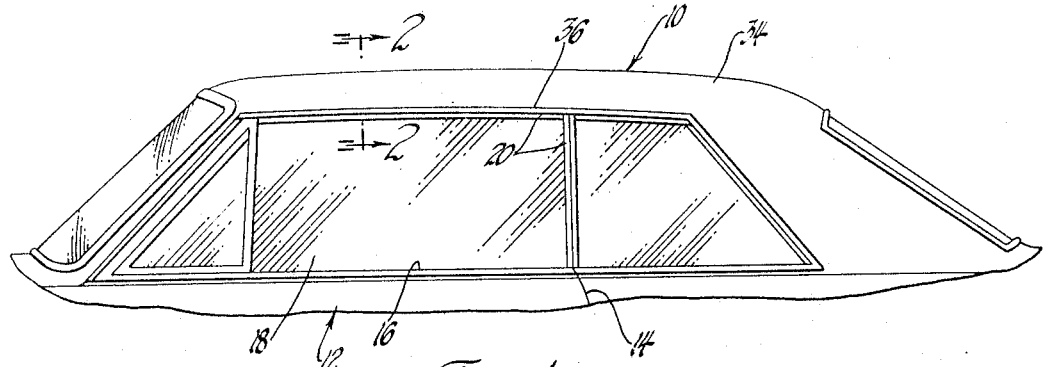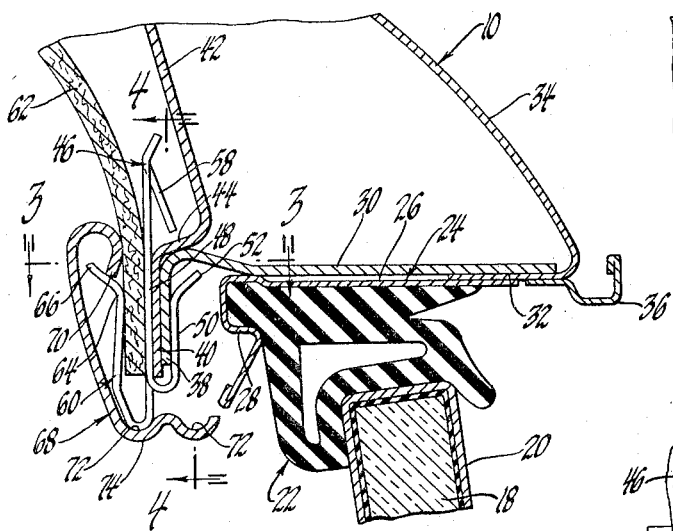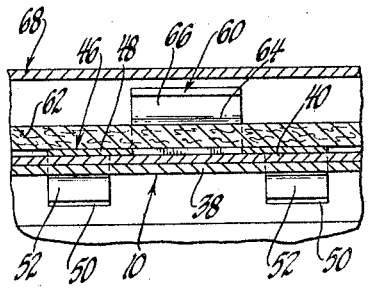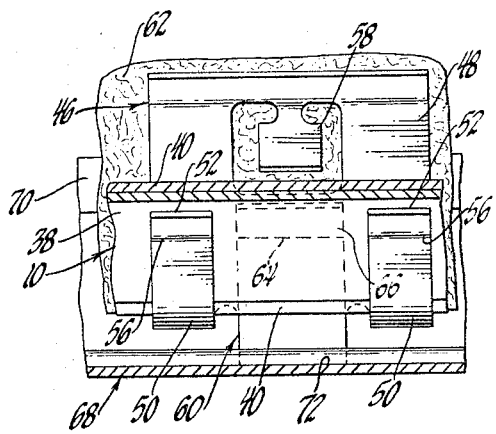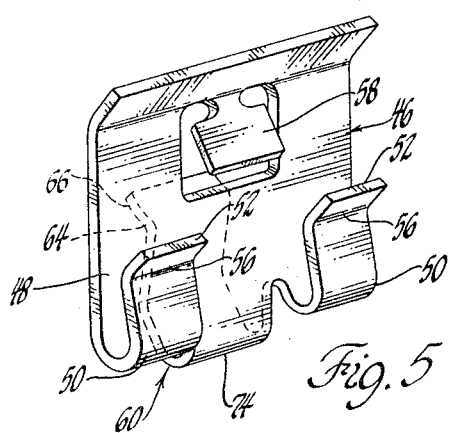
INVENTORS
Douglas T. Bull,
Donald A. Street, &
Wallace S. Wagner
BY Herbert Furman
ATTORNEY

3,294,436
VEHICLE BODY TRIM SUPPORT
Douglas T. Bull, Warren, Donald A. Street, Royal Oak, and Wallace S. Wagner, Farmington, Mich., assignors to General Motors Corporation, Detroit, Mich., a corporation of Delaware
Filed Sept. 3, 1964, Ser. No. 394,221
4 Claims. (Cl. 296—28)

This invention relates to vehicle bodies and more particularly to a vehicle body trim and molding arrangement.

One feature of this invention is that it provides an improved vehicle body trim and molding arrangement wherein a support member mounted on the body anchors an edge portion of vehicle body trim and also supports a body molding concealing the edge portion of the trim and the support member. Another feature of this invention is that the support member includes spaced pockets, one of the pockets being receptive of vehicle body flange structure to mount the support member thereon and the other of the pockets being receptive of the vehicle body trim. A further feature of this invention is that each pocket is formed by at least one return bent portion located in spaced relationship to a body portion of the support member. Yet another feature of this invention is that the molding member has means thereon cooperating with one of the return bent portions so as to be mounted on the support member. Yet a further feature of this invention is that the support member includes means overlying an adjacent shoulder of the body to provide a deterrent to removal of the support member.

These and other features of the trim and molding arrangement of this invention will be readily apparent from the following specification and drawings wherein:

FIGURE 1 is a partial side elevational view of a vehicle body embodying a trim and molding arrangement according to this invention;

FIGURE 2 is an enlarged sectional view taken generally along the plane indicated by line 2—2 of FIGURE 1;

FIGURE 3 is a sectional view taken generally along the plane indicated by line 3—3 of FIGURE 2;

FIGURE 4 is a sectional view taken generally along the plane indicated by line 4—4 of FIGURE 2; and FIGURE 5 is a perspective view of the support member.

Referring now to FIGURE 1 of the drawings, a vehicle body designated generally 10 includes a front door 12 which is hinged to the body 10 adjacent its forward edge for swinging movement between a closed position, as shown, and an open position, not shown. Door 12 is latched to the body adjacent the rearward edge 14 thereof in a conventional manner so as to be held in closed position. Body 10 is of the two door hardtop coupe type, and it will be noted that door 12 includes no door window frame structure above the belt line 16 of the body for the vertically movable door window 18, the rearward and upper edges of which are framed in a scalp molding 20.

As best shown in FIGURE 2, window 18 seals against a deflectable web type weatherstrip 22 in the closed position thereof and the closed position of door 12. The weatherstrip 22 is secured to a weatherstrip support or mounting member designated generally 24 which includes first and second offset flanges 26 and 28. Flange 26 is secured to a body header or outer roof rail member 30 such as by screws or otherwise, and it will be noted that flange 26 is offset so as to receive the lower edge 32 of the roof panel 34 of the body therebetween and the member 30. Flange 32 is secured to the header member 30 and supports a drip molding 36. The member 30 includes a laterally extending flange 38 which mates with and is secured to a flange 40 of an inner roof rail member 42 to provide a body pinchweld structure. Adjacent the flange 40 the member 42 includes an offset flange or shoulder 44 for a purpose to be described.

A support or mounting member designated generally 46 includes a body portion 48 and a first pair of return bent portions or legs 50 which are formed integral therewith and each of which includes an offset terminal flange 52 joined to the remainder thereof across a juncture bead 56. The legs 50 and the one side of the body portion 48 of member 46 define a pair of spaced pockets which are receptive of the flanges 38 and 40 of the body 10 so as to mount the member 46 thereon. It will be noted that the legs 50 extend at a smaller angle with respect to the one side of the body portion 48 in the unmounted position thereof than in the mounted position thereof so that the legs will tightly and frictionally engage the flange 38 of the pinchweld structure. The flanges 52 and beads 56 aid in mounting the member 46 on the body flanges 38 and 40.

The body portion 48 further includes a lanced, laterally extending tab or tang 58 which is formed integral therewith and extends oppositely to the legs 50 in overlying relationship to the shoulder or flange 44 of the member 42 to act as a deterrent to removal of the member 46 once it is mounted on the body pinchweld structure.

Another return bent leg 60 extends in spaced relationship to the other side of the body portion 48 of the member 46 and defines a second pocket receptive of the body headlining or trim 62 so as to anchor the edge portion of this trim on the member 46. It will be noted that the leg 60 includes a bead or bend 64 which tightly clamps the lower edge portion of the headlining 62 against the other side of the body portion 48 of member 46 and that this bead or bend merges into a laterally extending, arcuately shaped flange or terminal portion 66 providing ease of insertion of the trim 62.

A body garnish molding 68 is of generally C-shaped cross section and includes a first return bent edge portion or section 70 which engages the flange 66 and also the trim 62 so as to resiliently anchor the upper edge portion of the molding 68 and also conceal both the leg 60 and the lower edge portion of the trim 62 from view. The other edge portion of the molding 68 includes a flange portion of double-U configuration providing spaced, upwardly opening channels 72, either of which is receptive of the bight portion 74 of the leg 60 to mount the molding 68 on the member 46. It will be noted that the other edge portion of the molding 68 extends in close proximity to the lower edge portion of the flange 28 of the member 24 so as to form a continuation thereof and conceal the legs 50 and the one side of the member 46 from view.

Thus, this invention provides an improved trim and molding arrangement for vehicle bodies.

We claim:

1. In combination with a vehicle body having flange structure, a support member having a body portion and a pair of spaced return bent legs located in spaced relationship to one side of said body portion to provide spaced pockets receptive of said flange structure to mount said support member thereon, said member including a second return bent leg intermediate said first legs and in spaced relationship to another side of said body portion to provide a second pocket opening in the same direction as said first pockets and receptive of vehicle body trim, and a molding member having means thereon cooperating with means on one of said legs to mount said molding member on said support member in concealing relationship thereto and to said trim.

2. In combination with a vehicle body having flange structure, a support member having a body portion and a first return bent leg located in spaced relationship to one side of said body portion to provide a first pocket receptive of said flange structure to mount said support member thereon, said member including a second return bent leg in spaced relationship to another side of said body portion to provide a second pocket opening in the same direction as said first pocket and receptive of vehicle body trim, and a molding member having one edge portion thereof releasably secured to an edge portion of said second leg and an opposite edge portion thereof releasably secured to another edge portion of said second leg to mount said molding member on said support member in concealing relationship thereto and to said trim.

3. In combination with a vehicle body having flange structure and a shoulder adjacent said flange structure, a support member having a body portion and a first return bent leg located in spaced relationship to one side of said body portion to provide a first pocket receptive of said flange structure to mount said support member thereon, said member including a second return bent leg in spaced relationship to another side of said body portion to provide a second pocket receptive of vehicle body trim, a molding member having means thereon cooperating with means on one of said legs to mount said molding member on said support member in concealing relationship thereto and to said one leg, and releasable means on said body portion overlying said vehicle body shoulder to releasably mount said support member on said flange structure.

4. In combination with a vehicle body having flange structure, a support member having a body portion and a first return bent leg located in spaced relationship to one side of said body portion to provide a first pocket receptive of said flange structure to mount said support member thereon, said member including a second return bent leg joined thereto across a bight portion and having a free end, said second leg being located in spaced relationship to another side of said body portion to provide a second pocket receptive of vehicle body trim, and a molding member having a return bent edge thereof engaging said trim and said free end and a pocket thereof receiving said bight portion to mount said molding member on said support member in concealing relationship thereto and to said trim.

References Cited by the Examiner

UNITED STATES PATENTS 3,097,015 7/1963 Nagel _____ 296—137
3,195,948 7/1965 Sturtevant _____ 296—137

FOREIGN PATENTS 711,673 7/1954 Great Britain.

MILTON BUCHLER, *Primary Examiner.*

BENJAMIN HERSH, *Examiner.*

J. A. PEKAR, *Assistant Examiner.*